H. O. SHOCKLEY.
WHEEL.
APPLICATION FILED NOV. 25, 1911.
1,022,887.
Patented Apr. 9, 1912.
2 SHEETS—SHEET 2.
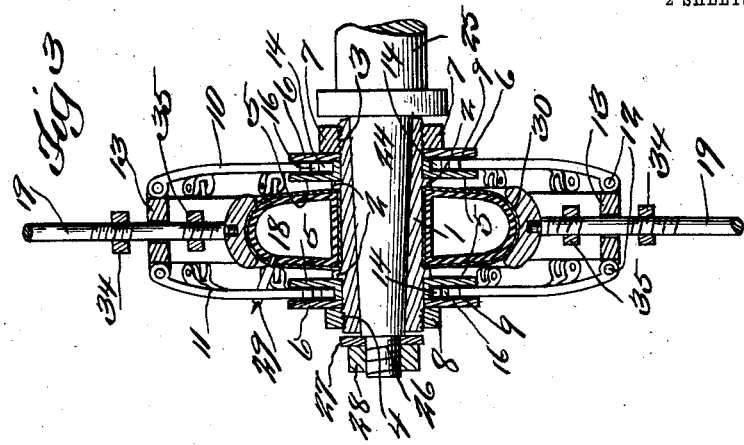
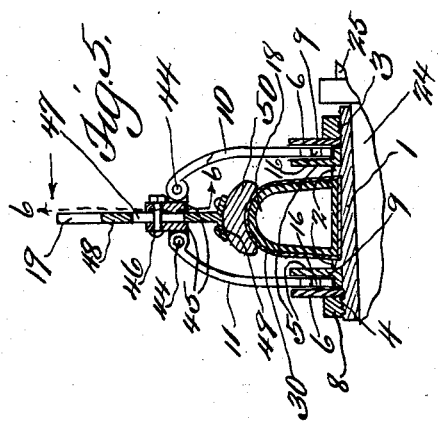
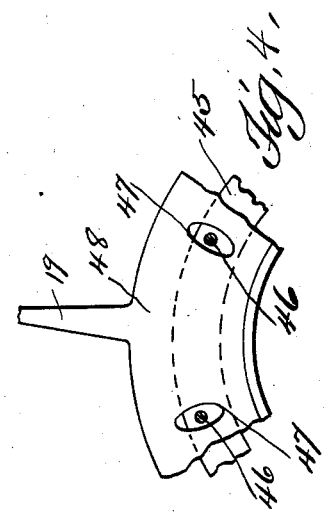
Witnesses
Francis T. Boswell,
C. E. Frothingham.
Inventor
H. O. Shockley,
By D. Swift & Co.
Attorneys

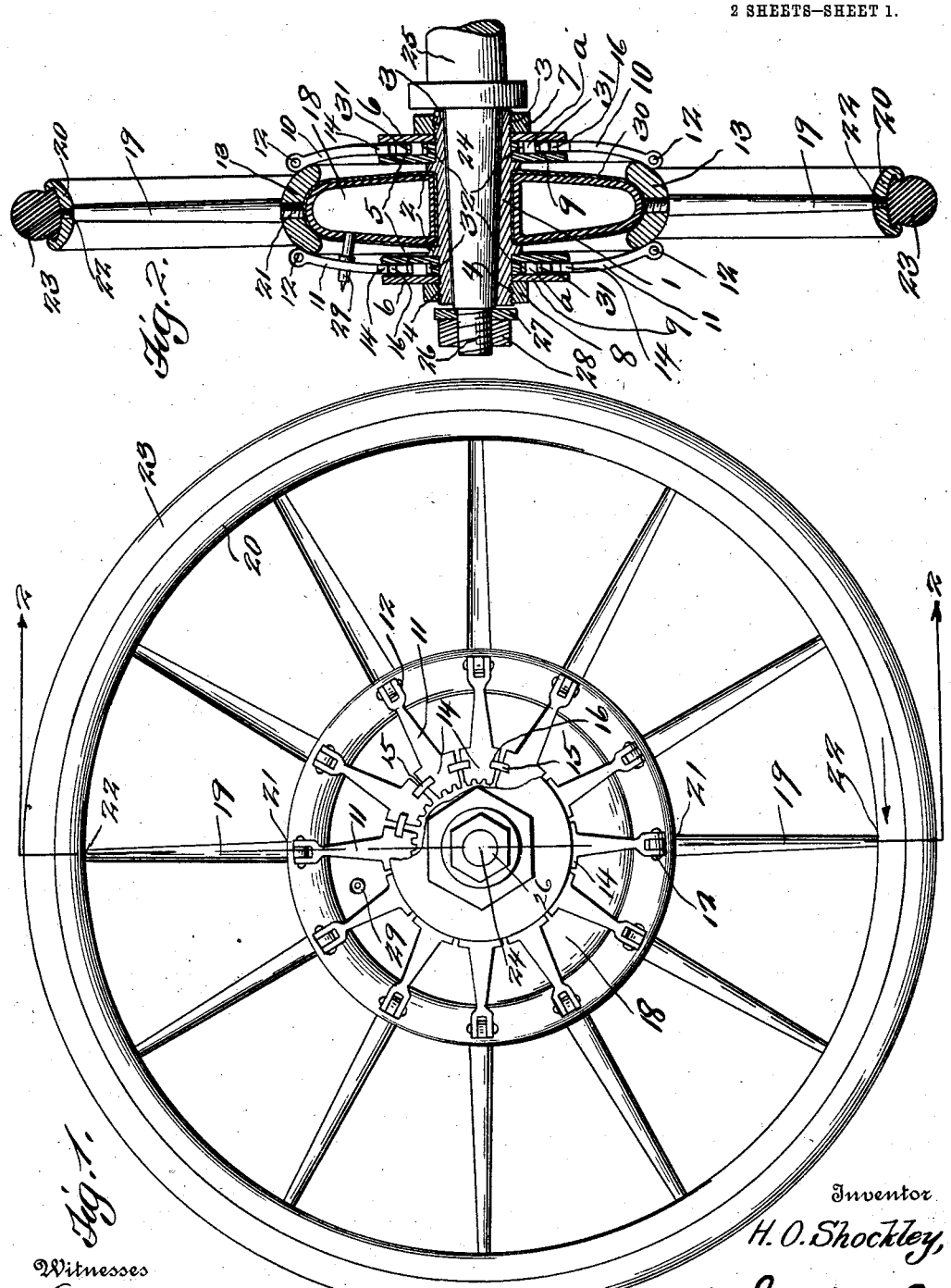

UNITED STATES PATENT OFFICE.

HARLOW ORVILLE SHOCKLEY, OF DARLINGTON, WISCONSIN.

WHEEL.

1,022,887.  Specification of Letters Patent.  Patented Apr. 9, 1912.

Application filed November 25, 1911. Serial No. 662,411.

*To all whom it may concern:*

Be it known that I, HARLOW O. SHOCKLEY, a citizen of the United States, residing at Darlington, in the county of Lafayette and State of Wisconsin, have invented a new and useful Wheel; and I do hereby declare the following to be a full, clear, and exact description of the invention, such as will enable others skilled in the art to which it appertains to make and use the same.

This invention relates to a new and useful vehicle wheel, and one in which the pneumatic cushion is arranged adjacent the hub of the wheel, thereby eliminating the possibility of the cushion becoming punctured.

The principal object of the invention is to provide a novel, simple, durable and inexpensive vehicle wheel having a skeleton casing inclosing the pneumatic cushion, and arranged adjacent the hub.

One of the features of the invention is to construct the skeleton casing in sections, which are held with relation to one another and in sequence by keys, and in such a manner as to permit any one of the sections to be swung on a pivot, thus permitting access to the pneumatic cushion.

The invention comprises further features and combination of parts, as hereinafter set forth, shown in the drawings and claimed.

In the drawings: Figure 1 is a view in side elevation of a vehicle wheel embodying the features of the invention. Fig. 2 is a sectional view on line 2—2 of Fig. 1. Fig. 3 is a sectional view partly broken away of a vehicle wheel showing a different construction. Fig. 4 is a sectional view on line 6—6 of Fig. 5. Fig. 5 is a fragmentary sectional view of a portion of a vehicle wheel showing another form thereof.

Referring to the drawings 1 designates the hub of the wheel having annular flanges 2, and provided with threads 3 and 4 at each end. The portions beyond the flanges 2 are passed through the rings 5 and the washer plates 6. The rings 5 in cross section, as appears in Fig. 2 are L-shaped, and the plates 6 fit against them as shown. The nuts 7 and 8 engage the threads 3 and 4 for the purpose of holding the plates 6 closely in engagement with the rings 5, thereby affording U-shaped guides 9 for the hinged spokes 10 and 11. These spokes 10 and 11 at their outer portions are hinged at 12 to the rim 13, while the inner ends of the spokes 10 and 11 terminate into broad plates 14, which are the parts that are actually guided in the U-shaped guides. These plates 14 are held in relation to one another and in sequence by the keys 15, which inter-engage the notches or recesses 16 of the various plates 14. When the plates 14 are held in sequence by the keys 15, and the plates 6 screwed tight against the rings 5, the spokes 11 and the plates 14 act substantially as a rigid member, guided between the rings 5 and the plates 6. Surrounding the hub 1 is a pneumatic cushion 18, which is held substantially in position by the flanges 2. The rim 13 is curved to fit the pneumatic cushion, as shown in the drawings, and to act thereagainst as the wheel is in motion. The spokes 19 are threaded into the rims 13 and 20, as at 21 and 22. The rim 20 may be of the usual construction, and adapted to receive any suitable tire 23. The spindle 24 of the axle 25 is provided with a restricted threaded end 26, which receives the washer 27 and the nut 28, for holding the hub 1 on the spindle. The pneumatic cushion 18 is provided with the usual form of automatic valve 29, which will open automatically, when air under pressure is forced into the cushion 18. The pneumatic cushion 18 is provided with an outer lining of asbestos or the like 30, to prevent or lessen the chances of a blow out from overheating of the cushion.

Should the wheel be a drive rear wheel of the vehicle, the inner edges of the plates 14 may be provided with gear teeth 31, while the rings 5 are provided with similar teeth 32. In case the pneumatic cushion blows out entirely, the teeth 31 and 32 will mesh at *a*, thus causing the wheel to continue revolubly. It is to be understood that two pneumatic cushions arranged side by side may be utilized, in which event the rim 13 should be made wider, whereas the remaining structure, is identical to that shown in Fig. 2. In Fig. 3 the structure is approximately similar to that shown in Figs. 1 and 2, with the exception that the spokes 10 and 11 do not move between the rings 5 and the plates 6, but the spokes 19 slide through the rim 13, their movements being limited by means of the buffers 34 and 35, which are threaded to the spokes 19.

In Fig. 5 the spokes 10 and 11 are hinged at 44 to the annular rings 45, which are bolted together by the bolts 46, which bolts pass through the elongated slots 47 in the annular ring 48, which is bolted or otherwise secured at 49 to the rim 50. This ring 48 is formed integral with the spoke 19, as shown in Fig. 6. The slots 47 in the ring 48 are a substitute for the buffers 34 and 35.

To gain access to the pneumatic cushion, the nuts 8 and 28, and the washer 37 are first removed reference being had to Fig. 2, after which the plate 6 is removed. Then by throwing the spokes 11, on their hinge connections, the outer ring 5 may be removed, thus allowing access to the pneumatic cushion. By deflating the pneumatic cushion the same may be removed. Access to the pneumatic cushions in the other structures in Figs. 3, and 5, may be had in a similar way.

From the foregoing it will be noted that, there has been devised a simple, novel and efficient vehicle wheel, in which the pneumatic cushion is so disposed as to relieve the jars and jolts on the axle incident to the wheel, and to prevent punctures, and one which has been found practical for use on automobiles and the like.

In the drawings there has been disclosed certain structures, but in practical fields these structures may necessitate alterations, to which the patentee is entitled, provided the alterations are comprehended within the scope of what is claimed.

The invention having been set forth, what is claimed as new and useful:

In a vehicle wheel, a hub member, a pneumatic cushion surrounding the same, U-shaped guides on each end of the hub member, a rim surrounding the pneumatic cushion, spokes hinged to the rim with their inner ends guided in the U-shaped guides, the spokes having their inner ends terminating in plates, the adjacent ends of which having notches, and keys inter-engaging the notches for locking the plates together and in sequence.

In testimony whereof I have signed my name to this specification in the presence of two subscribing witnesses.

HARLOW ORVILLE SHOCKLEY.

Witnesses:
C. F. McDANIEL,
J. K. CAREY.

Copies of this patent may be obtained for five cents each, by addressing the "Commissioner of Patents, Washington, D. C."